US011765050B1

(12) United States Patent
Nainar et al.

(10) Patent No.: US 11,765,050 B1
(45) Date of Patent: Sep. 19, 2023

(54) EVENT TRIGGERED GUARANTEED SERVICE CONNECTIVITY

(71) Applicant: Cisco Technology, Inc., San Jose, CA (US)

(72) Inventors: Nagendra Kumar Nainar, Morrisville, NC (US); Carlos M. Pignataro, Cary, NC (US); Paul Brian Giralt, Cary, NC (US); Gonzalo Salgueiro, Raleigh, NC (US); David John Zacks, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/695,085

(22) Filed: Mar. 15, 2022

(51) Int. Cl.
*H04L 41/5009* (2022.01)
*H04L 41/5041* (2022.01)

(52) U.S. Cl.
CPC ...... *H04L 41/5009* (2013.01); *H04L 41/5045* (2013.01)

(58) Field of Classification Search
CPC .. G06Q 30/04; H04M 15/42; H04M 2215/56; H04L 41/5025; H04L 41/5019; H04L 41/5022; H04L 41/5012; H04L 41/5009
See application file for complete search history.

(56) References Cited

U.S. PATENT DOCUMENTS

| | | |
|---|---|---|
| 2010/0020685 A1* | 1/2010 | Short ............... H04L 12/1439 370/230 |
| 2011/0075671 A1 | 3/2011 | Davidson et al. |
| 2016/0165480 A1 | 6/2016 | Sachdev et al. |
| 2017/0280296 A1* | 9/2017 | Divakaran ........ H04W 72/0446 |
| 2019/0098082 A1* | 3/2019 | Hansen ............. H04L 67/1097 |
| 2019/0132222 A1* | 5/2019 | Son ..................... H04L 47/781 |
| 2019/0190746 A1 | 6/2019 | Lee et al. |
| 2021/0288881 A1 | 9/2021 | Zhang |
| 2021/0367832 A1 | 11/2021 | Ramachandran et al. |

* cited by examiner

*Primary Examiner* — Joe Chacko
(74) *Attorney, Agent, or Firm* — Edell, Shapiro & Finnan, LLC

(57) ABSTRACT

A device associated with an enterprise receives, from a user device, a message indicating that a user of the user device has requested a service level for accessing a service while performing teleworking activities for the enterprise. The user device accesses the service via a network that includes a portion controlled by an Internet Service Provider (ISP). The enterprise has established an agreement with the ISP indicating that the ISP is to provide service levels for users who are performing teleworking activities for the enterprise via the ISP. The ISP associated with the user device is identified based on the message. A request is transmitted to the ISP to provide the service level for the portion of the network that is controlled by the ISP and the ISP provides the service level for accessing the service based on the request.

20 Claims, 6 Drawing Sheets

US 11,765,050 B1

EVENT TRIGGERED GUARANTEED SERVICE CONNECTIVITY

TECHNICAL FIELD

The present disclosure relates to data and communication networks.

BACKGROUND

Teleworkers working remotely from home or other non-corporate environments may be connected to a cloud or corporate network for performing teleworking activities through best-effort Internet connectivity with minimal or no guaranteed service level agreement. A teleworker may experience service interruptions or poor performance (e.g., choppy video or audio, Virtual Private Network (VPN) disconnect, slowness, etc.) when performing teleworking activities due to first-mile connectivity problems associated with an Internet Service Provider (ISP) providing services to the teleworker's home or non-corporate environment.

DESCRIPTION OF EXAMPLE EMBODIMENTS

Overview

Figure 1:
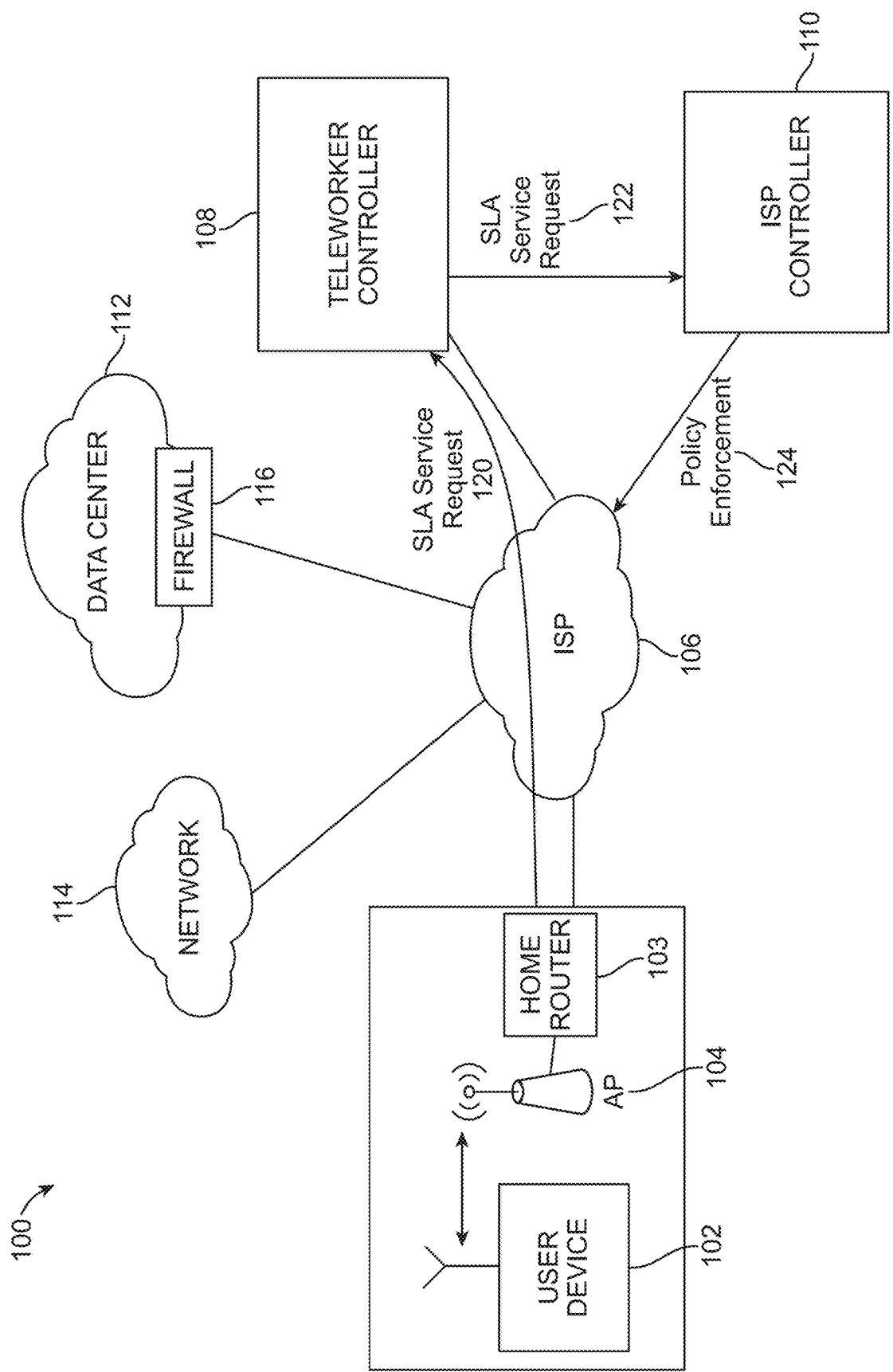
FIG. 1 is an overview diagram illustrating a network environment configured to provide a user triggered service level agreement (SLA)-based access connectivity for a teleworker accessing a cloud/enterprise network via an ISP, in accordance with an example embodiment.

Presented herein are embodiments that provide guaranteed service levels for a user performing teleworking activities via an ISP. A message is received, from a user device, at a device associated with an enterprise, the message indicating that a user of the user device has requested a service level for accessing a service while performing teleworking activities for the enterprise. The user device accesses the service via a network that includes a portion controlled by an ISP and the enterprise has established an agreement with the ISP indicating that the ISP is to provide service levels for users who are performing teleworking activities for the enterprise via the ISP. The ISP associated with the user device is identified based on the message. A request is transmitted to the ISP to provide the service level for the portion of the network that is controlled by the ISP and the ISP provides the service level for accessing the service based on the request.

Example Embodiments

When performing teleworking activities for an enterprise or other employer, a teleworker may be connected to a cloud/Software as a Service (SaaS) or enterprise network via a home ISP router with a single connectivity. One option for providing a guaranteed SLA for the teleworker may be to use multiple Internet connections and leverage technologies, such as a software-defined wide area network (SDWAN). However, in this scenario, the wide area network (WAN) circuits used may be associated with different Internet providers that do not provide an SLA guarantee. Therefore, the SDWAN may toggle between two circuits that do not offer a SLA, so there is no guarantee that the connection provides a desired level of service. In addition, there is no guarantee that the WAN circuits are disjointed and so there may be a common point where a failure occurs. In this situation, toggling the first-mile circuit may not fix an issue caused by the failure.

Another option may be to leverage a software-defined cloud interface (SDCI) or a cloud interconnect tunnel in which a home router establishes connectivity to the nearest SDCI Point-of-Presence (POP) node for guaranteed service to the cloud/enterprise network. While this option may provide guaranteed service once the traffic reaches the POP node, the first mile controlled by the ISP is still a challenge as it is not SLA bounded or guaranteed.

Techniques are provided for leveraging incoming session-based first-mile information along with cross-domain controller communication to dynamically create guaranteed first-mile connectivity and/or SDCI tunnels for end-to-end guaranteed service. A company, corporation, or enterprise may establish an agreement with one or more ISPs to provide a guaranteed SLA for teleworkers accessing a cloud/enterprise network via the ISP. When an incoming connection or request for services associated with teleworking activities is received, a teleworker controller may notify the ISP of the connection/request and the ISP may provide the guaranteed SLA to the teleworker for a period of time. In this way, connection service interruptions or other issues (e.g., slowness, choppiness, etc.) may be avoided by providing first-mile guaranteed service.

FIG. 1 is an overview diagram illustrating a network environment 100 configured to provide a user triggered SLA-based access connectivity for a teleworker accessing a cloud/enterprise network via an ISP, in accordance with an example embodiment. The network environment 100 includes a user device 102 in communication with a wireless access point (AP) 104. The user device 102 may access teleworking services provided by data center 112 or a network 114 via AP 104 and ISP 106. User device 102 may additionally communicate with teleworker controller 108 to request a guaranteed service level for performing teleworking activities. Teleworker controller 108 may communicate with ISP controller 110 to request that the ISP provide a guaranteed level of service for user device 102 for performing teleworking activities.

Generally, user device 102 may be associated with any electronic wireless device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, a video conference endpoint, any other device and/or combination of devices, component, element, and/or object capable of initiating voice, audio, video, media, or data exchanges within network environment 100. User device 102 discussed herein may also be inclusive of a suitable interface to a human user such as a microphone, a display, a keyboard, or other terminal equipment.

User device 102 discussed herein may also be any device that seeks to initiate a communication on behalf of another entity or element such as a program, a database, or any other component, device, element, or object capable of initiating an exchange within systems discussed herein. It is to be understood that any number of user devices may be present in systems discussed herein. User device 102 may be configured with hardware (e.g., communications units, receiver(s), transmitter(s), antenna(s) and/or antenna arrays, processor(s), memory element(s), baseband processor(s) (modems), etc.), software, logic, and/or the like (e.g., a wireless wide area network (WWAN) (e.g., cellular) communications unit, a wireless local area network (WLAN) (e.g., Wi-Fi®), etc.) to facilitate over-the-air Radio Frequency (RF) connections with any combination of access networks, such as a WLAN facilitated via AP 104.

AP 104 may include any combination of hardware (e.g., communications units, receiver(s), transmitter(s), antenna(s) and/or antenna array(s), processor(s), memory element(s), baseband processor(s) (modems), etc.), controllers, software, logic, and/or the like to facilitate over-the-air RF WLAN connections (e.g., Wi-Fi® connections) with one or more devices, such as user device 102). Home router 103 may include any combination of hardware (e.g., communications units, receiver(s), transmitter(s), antenna(s) and/or antenna array(s), processor(s), memory element(s), baseband processor(s) (modems), etc.), controllers, software, logic, and/or the like to facilitate transmission of information between devices in a home network (e.g., user device 102) and the Internet or other network. Home router 103 may have a public Internet Protocol (IP) address assigned by ISP 106. In some embodiments, AP 104 and home router 103 may be integrated into a single device with a combined functionality. In other embodiments, AP 104 and home router 103 may be configured as separate devices that communicate via a connection (e.g., a wired connection).

Data center 112 may contain computing devices (servers), data storage and a network associated with a particular company/corporation/enterprise or other type of employer. Data center 112 may provide access to services, such as services for performing teleworking activities. User device 102 may access data center 112 for performing certain teleworking activities. Data center 112 may include firewall 116. Firewall 116 may include functionality for monitoring incoming and outgoing traffic associated with data center 112 and determining whether to block or allow certain traffic. In some embodiments, firewall 116 may extract information associated with incoming session requests to data center 112 and notify teleworker controller 108 about the incoming session requests.

In some situations, user device 102 may access network 114 for performing other teleworking activities. For example, certain services, such as videoconferencing services, may be provided through network 114 instead of through data center 112. Network 114 may include the Internet or other network associated with another entity (e.g., a videoconferencing service). The company/corporation/enterprise or other employer associated with data center 112 may have established an agreement or business liaison with ISP 106 indicating that ISP 106 is to provide a guaranteed level of service to a user of user device 102 while the user is performing teleworking activities (e.g., based on a "pay as you go" or other business model). The ISP 106 may provide Internet services to the user at the user's home other non-corporate environment and ISP 106 may control a portion of a network between user device 102 and network 114 or data center 112 for performing teleworking activities.

Teleworker controller 108 may be associated with the company/corporation/enterprise or other employer and may leverage information associated with user device 102 and the user of user device 102 to determine which policies to apply to user device 102. For example, teleworker controller 108 may determine a level of service to request ISP 106 to provide to user device 102 based on user information and other information (e.g., a type of service requested by a user device 102). Teleworker controller 108 may communicate with ISP controller 110 to request that ISP 106 provide the guaranteed service level to user device 102 for performing teleworking activities. In turn, ISP controller 110 may enforce ISP policies to provide the guaranteed service level to user device 102 for performing the teleworking activities.

As illustrated in FIG. 1, at 120, user device 102 may transmit an SLA service request to teleworker controller 108 for accessing a service for performing teleworking activities. For example, the user device 102 may transmit the request to access services (e.g., videoconferencing services) provided by network 114. In other embodiments, user device 102 may transmit the request to access services provided by data center 112. The SLA service request 120 may include a public IP address of home router 103 associated with the user device 102 and other related information (e.g., information associated with user device 102, information associated with a user of user device 102, etc.). The public IP address of the home router 103 may be assigned by ISP 106.

The SLA service request may be transmitted based on an upcoming event (e.g., a scheduled videoconference), the SLA service request may be a request for an "always on" guaranteed service level, or the SLA service request may be a request for a guaranteed service level for a period of time. If the SLA service request is based on an upcoming event, the SLA service request 120 may include information associated with the event, such as a type of the event, a duration of the event, etc. If the SLA service request is not transmitted based on an upcoming event, the SLA service request may include an indication of a duration of time for which the guaranteed service level is being requested. In some embodiments, the SLA service request may include information associated with a type of service (e.g., teleconference/videoconference, file upload, etc.) being accessed by the user device 102.

Teleworker controller 108 may receive the SLA service request and may use information contained in the SLA service request (e.g., the public IP address of home router 103, the user information, information associated with the requested service or upcoming event, etc.) to identify the ISP associated with the user device 102 and, in some situations, a type of the service level required and/or a duration of the service level. In some embodiments, the user information may be used to classify a type of service level required by the user. For example, if the user is an executive user, the user may require a guaranteed bandwidth, loss-sensitive connection. However, if the user is a traditional user (e.g., a non-executive user), the user may require best-effort service or just a guaranteed bandwidth (and no loss-sensitive, etc.) connection. Additionally, a type of service or event being accessed may be used to determine a type of service level required. For example, a videoconferencing service may require a different service level than a file upload service.

At 122, teleworker controller 108 may transmit an SLA service request to ISP controller 110 requesting the guaranteed service level for user device 102. The SLA service request may include the public IP address of the home router 103 in addition to other information (e.g., a type of the SLA required, a duration of the SLA, etc.). For example, if the SLA service request 120 is a request for guaranteed SLA service for a 1 hour videoconference session from 11 AM to 12 PM, SLA service request 122 may be a request to create a policy from 11 AM to 12 PM to prioritize videoconferencing service traffic from the public IP address of home router 103. At 124, ISP controller 110 may enforce the policy to provide the guaranteed service level to user device 102 for the specified event/service and possibly for a specified duration. ISP controller 110 may create relevant policies on the POP router(s) associated with user device 102 for enforcing the guaranteed service level. In some embodiments, an SDCI or cloud interconnect tunnel may be established for end-to-end guaranteed service based on how the user device 102 and the requested service are connected.

By enforcing SLA policies at the ISP, a guaranteed service level may be provided between user device 102 and network 114 and/or data center 112 for accessing services for performing teleworking activities. For example, choppiness, slowness, and other issues that may be caused by problems at the ISP may be eliminated.

Figure 2:
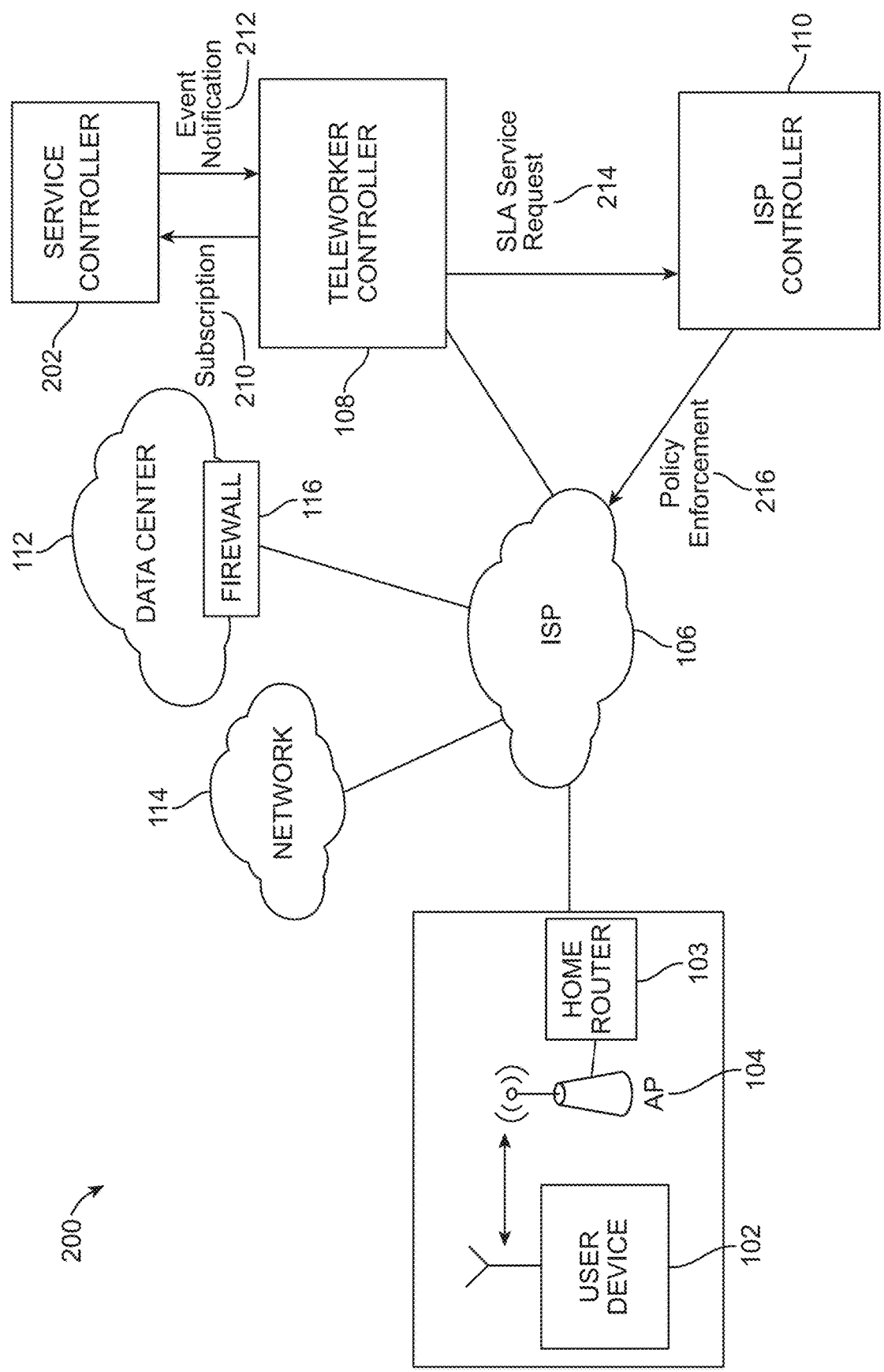
FIG. 2 is an overview diagram illustrating a network environment configured to provide a service triggered guaranteed SLA-based access connectivity for a teleworker accessing a cloud/enterprise network via an ISP, in accordance with an example embodiment.

Reference is now made to FIG. 2. FIG. 2 is an overview diagram illustrating a network environment 200 configured to provide a service triggered guaranteed SLA-based access connectivity for a teleworker accessing a cloud/enterprise network via an ISP, in accordance with an example embodiment. The network environment 200 includes user device 102, AP 104, ISP 106, teleworker controller 108, ISP controller 110, data center 112, network 114, and service controller 202. Service controller 202 may be associated with a service accessed by users for performing teleworking activities. For example, service controller 202 may be associated with a videoconferencing service, a file sharing service, or another type of service. In the embodiments described in FIG. 2, a teleworker may access different services using an inbound teleworker session and teleworker controller 108 may subscribe to receive indications of upcoming events associated with the teleworker.

As shown in FIG. 2, upon receiving an inbound registration of the teleworker (e.g., by a simple registration from the teleworker or using firewall 116 at data center 112), at 210, teleworker controller 108 may send a subscription message to service controller 202 using the user details included in the inbound registration. The subscription message allows teleworker controller 108 to subscribe to receive notifications of upcoming events associated with the user. For example, if service controller 202 is associated with a videoconferencing service, teleworker controller 108 may subscribe to receive information associated with upcoming videoconferences/meetings for a user or for indications of inbound audio/video calls for the user.

At 212, service controller 202 may send teleworker controller 108 a notification of an event. For example, in the case where service controller 202 is associated with a videoconferencing service, service controller 202 may send teleworker controller 108 a notification about an upcoming videoconference/meeting (e.g., a few minutes before the start of the videoconference/meeting). The event notification may include information associated with the event (e.g., a type of the event, beginning and ending times for the event, etc.), a user participating in the event, and/or user device 102 (e.g., an address of user device 102 and/or home router 103) being used by the user. Teleworker controller 108 may identify a type of the service level desired and a duration of the service level based on the information associated with the upcoming event and possibly based on user information. For example, teleworker controller 108 may identify the type of the service level in a similar manner as discussed above with respect to FIG. 1.

Based on receiving the event notification, teleworker controller 108 may identify the ISP 106 associated with the user device 102 and, at 214, may transmit an SLA service request to ISP controller 110 requesting the guaranteed service level for user device 102 for the event in a similar manner as discussed in 122 in FIG. 1. The SLA service request 214 may include the public IP address of home router 103 in addition to other information (e.g., a type of the SLA required, a duration of the SLA, etc.). At 216, ISP controller 110 may enforce a policy to provide the guaranteed service level to user device 102 (i.e., for devices associated with the public IP address of the home router 103) for the specified event/service and possibly for a specified duration. In some embodiments, an SDCI or cloud interconnect tunnel may be established for end-to-end guaranteed service based on how the user device 102 and the requested service are connected.

By providing a service triggered guaranteed SLA-based access connectivity, a user may receive a guaranteed service level for events without having to request the guaranteed service level. In other words, the service level is automatically provided based on upcoming event triggers without the user having to request the service level.

Figure 3:
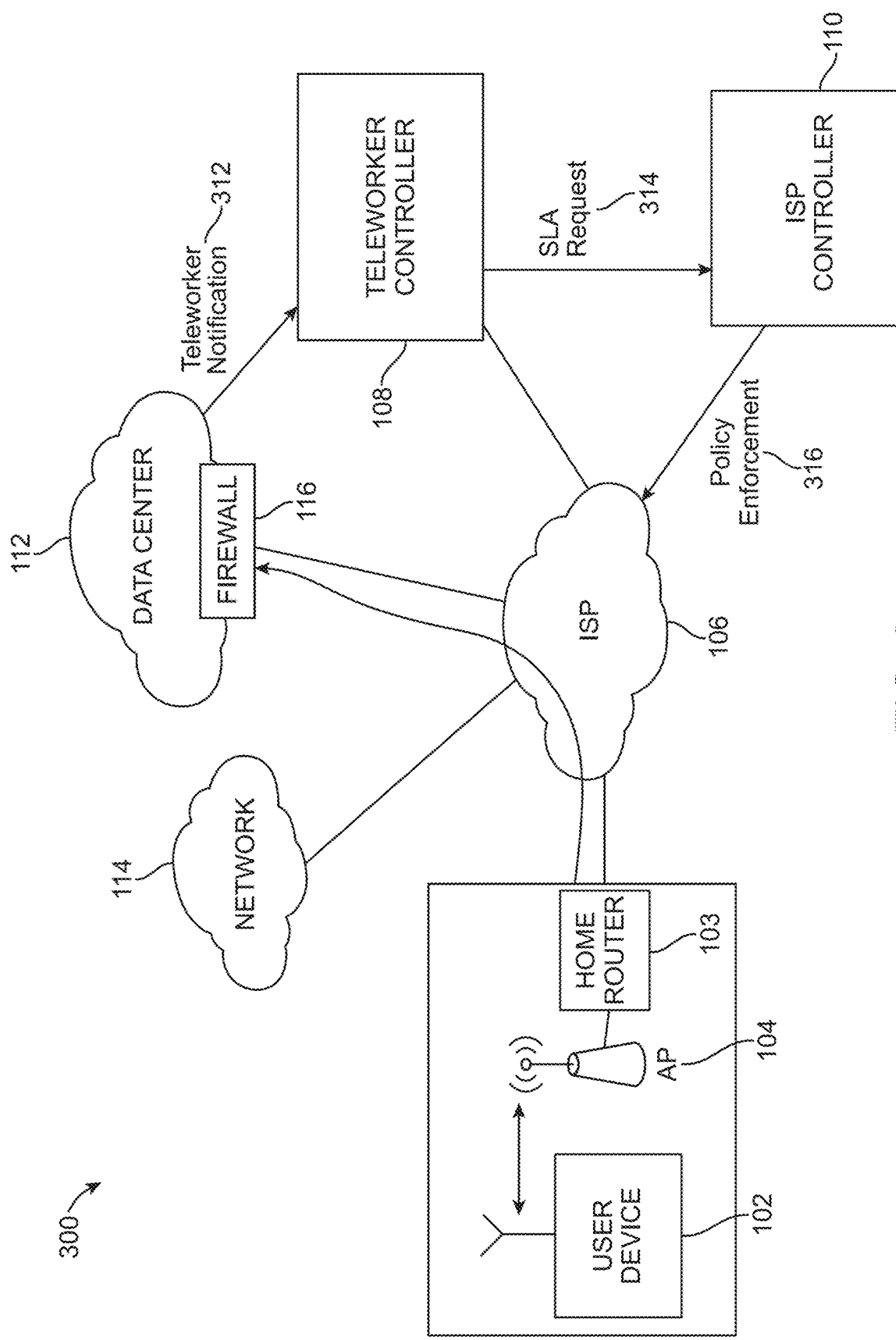
FIG. 3 is an overview diagram illustrating a network environment configured to provide a gateway triggered guaranteed SLA-based access connectivity for a teleworker accessing an enterprise network via an ISP, in accordance with an example embodiment.

Reference is now made to FIG. 3. FIG. 3 is an overview diagram illustrating a network environment 300 configured to provide a gateway triggered guaranteed SLA-based access connectivity for a teleworker accessing an enterprise network via an ISP, in accordance with an example embodiment. The network environment 300 includes user device 102, AP 104, ISP 106, teleworker controller 108, ISP controller 110, data center 112, and network 114.

As illustrated in FIG. 3, at 310, data center 112 receives an inbound VPN tunnel session request from user device 102. The inbound VPN tunnel request is used to request guaranteed SLA-based access connectivity for a user of user device 102. The VPN session request (and the established tunnel from user device 102 to data center 112) may use the public IP address of a home router 103 associated with user device 102 that was assigned by ISP 106. A firewall 116 associated with data center 112 extracts information from the VPN session request. For example, the firewall 116 may extract the public IP address associated with the home router 103, user details associated with a user of user device 102, and/or additional information.

At 312, data center 112 transmits a teleworker notification to teleworker controller 108 notifying teleworker controller 108 about the new teleworker session. Teleworker controller 108 leverages the user information to identify the service policies to be applied to the session. In some embodiments, additional attributes may be used to determine the service policies to be applied.

Teleworker controller 108 determines the ISP associated with user device 102 and, at 314, teleworker controller 108 transmits an SLA request to ISP controller 110. The SLA request may include the public IP address and other information, such as an indication of the service policies to apply to the session. At 316, ISP controller 110 applies the policies to enforce the SLA for the portion of the network between user device 102 and data center 112 that is controlled by ISP 106. The ISP controller 110 may use the public IP address of the home router 103 to identify the respective POP router (or home router if managed) to enable any service for guaranteed access.

When both the user and the corporate network are sharing the same ISP network, end-to-end service can be guaranteed. Additionally, traffic awareness may be implemented in which the firewall 116 monitors the type of traffic from user device 102 and identifies whether any special treatment is required based on the type of the traffic (e.g., teleconferencing audio/video that indicates an ongoing session) or based on monitoring using a network monitoring tool. In this scenario, the firewall 116 may not request a guaranteed SLA at all times and may only send a request to teleworker controller 108 when it is determined, based on the monitoring, that the special treatment is required.

Figure 4:
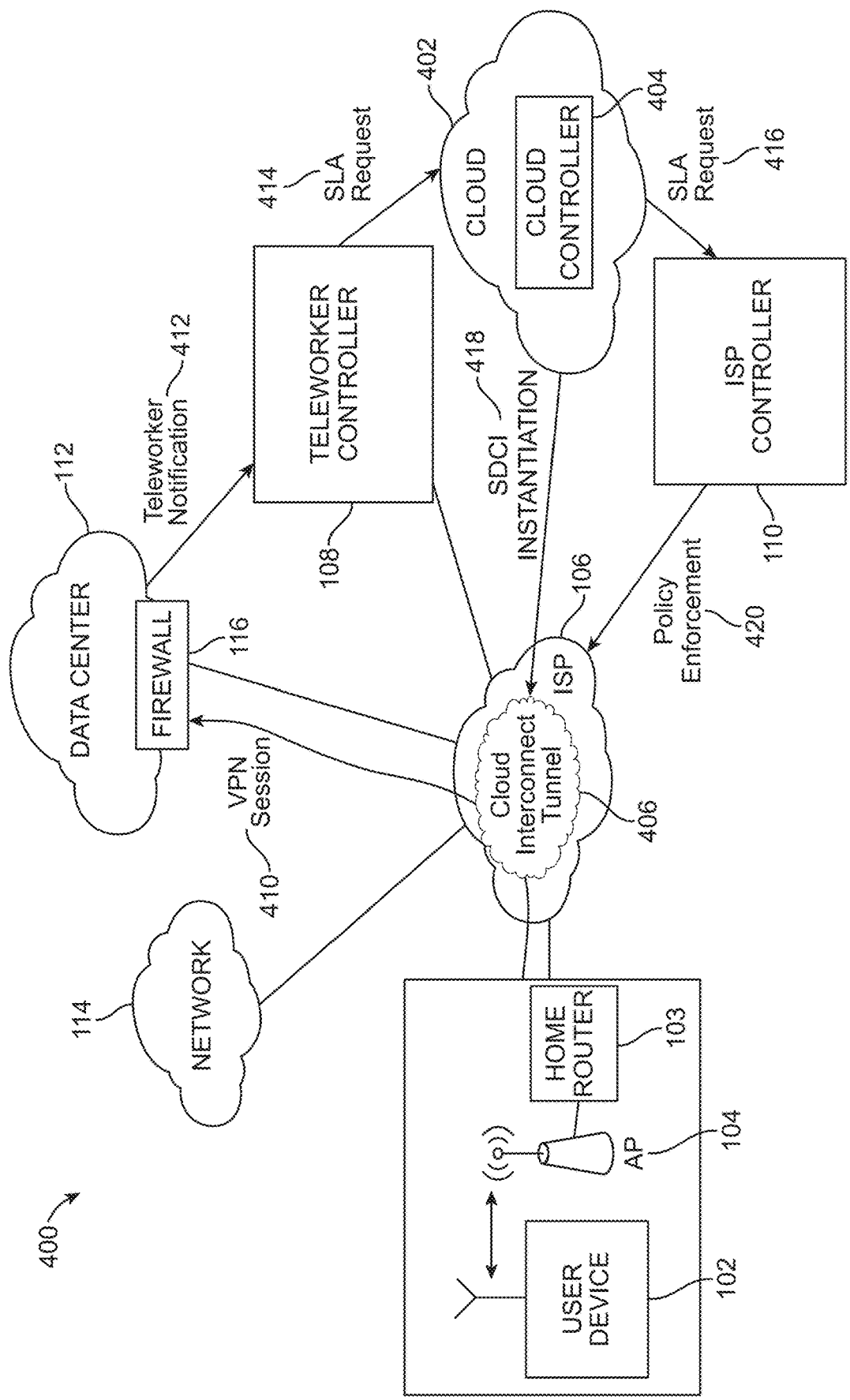
FIG. 4 is an overview diagram illustrating a network environment configured to provide a gateway triggered guaranteed SLA-based guaranteed end-to-end connectivity for a teleworker accessing an enterprise network via an ISP, in accordance with an example embodiment.

Reference is now made to FIG. 4. FIG. 4 is an overview diagram illustrating a network environment 400 configured to provide a gateway triggered guaranteed SLA-based guaranteed end-to-end connectivity for a teleworker accessing an enterprise network via an ISP, in accordance with an example embodiment. The network environment 400 includes user device 102, AP 104, ISP 106, teleworker controller 108, ISP controller 110, data center 112, network 114, cloud 402, cloud controller 404, and cloud interconnect tunnel 406.

As illustrated in FIG. 4, at 410, data center 112 receives an inbound VPN tunnel session request from user device 102. The inbound VPN tunnel request is used to request SLA-based end-to-end connectivity. The SLA-based end-to-end connectivity request may be used in scenarios in which part of the network between user device 102 and data center 112 is not managed/controlled by the company/corporation/enterprise or the ISP 106. Firewall 116 associated with data center 112 uses the inbound VPN request to extract information (e.g., public IP address of the home router 103, user information associated with a user of user device 102, etc.). At 412, data center 112 (e.g., firewall 116 or a controller) transmits a teleworker notification to teleworker controller 108. The teleworker notification may include information (e.g., header details) extracted from the VPN request.

Teleworker controller 108 leverages the information in the notification to identify an ISP associated with user device 102 and the service policies to be applied to the session and, at 414, transmits an SLA request to cloud 402 (e.g., to cloud controller 404, such as a SDWAN controller), the request including the service policies and a public IP address of home router 103. At 416, cloud 402 transmits an SLA request to ISP controller 110 requesting the guaranteed service for the session based on the service policies. At 418, cloud 402 additionally establishes cloud interconnect tunnel 406 (e.g., an SDCI tunnel) from user device 102 to the firewall 116 at data center 112. At 420, ISP controller 110 enforces the services policies for the session.

The ISP-enforced policy will help guarantee the service/connectivity from user device 102 to the POP of cloud interconnect tunnel 406 and the cloud interconnect tunnel 406 guarantees the service/connectivity for the rest of the network between user device 102 and the data center 112. This approach to providing a guaranteed end-to-end connectivity may disable split-tunneling to steer all the traffic over the VPN tunnel to leverage the guaranteed service benefits offered for the VPN tunnel.

Figure 5:
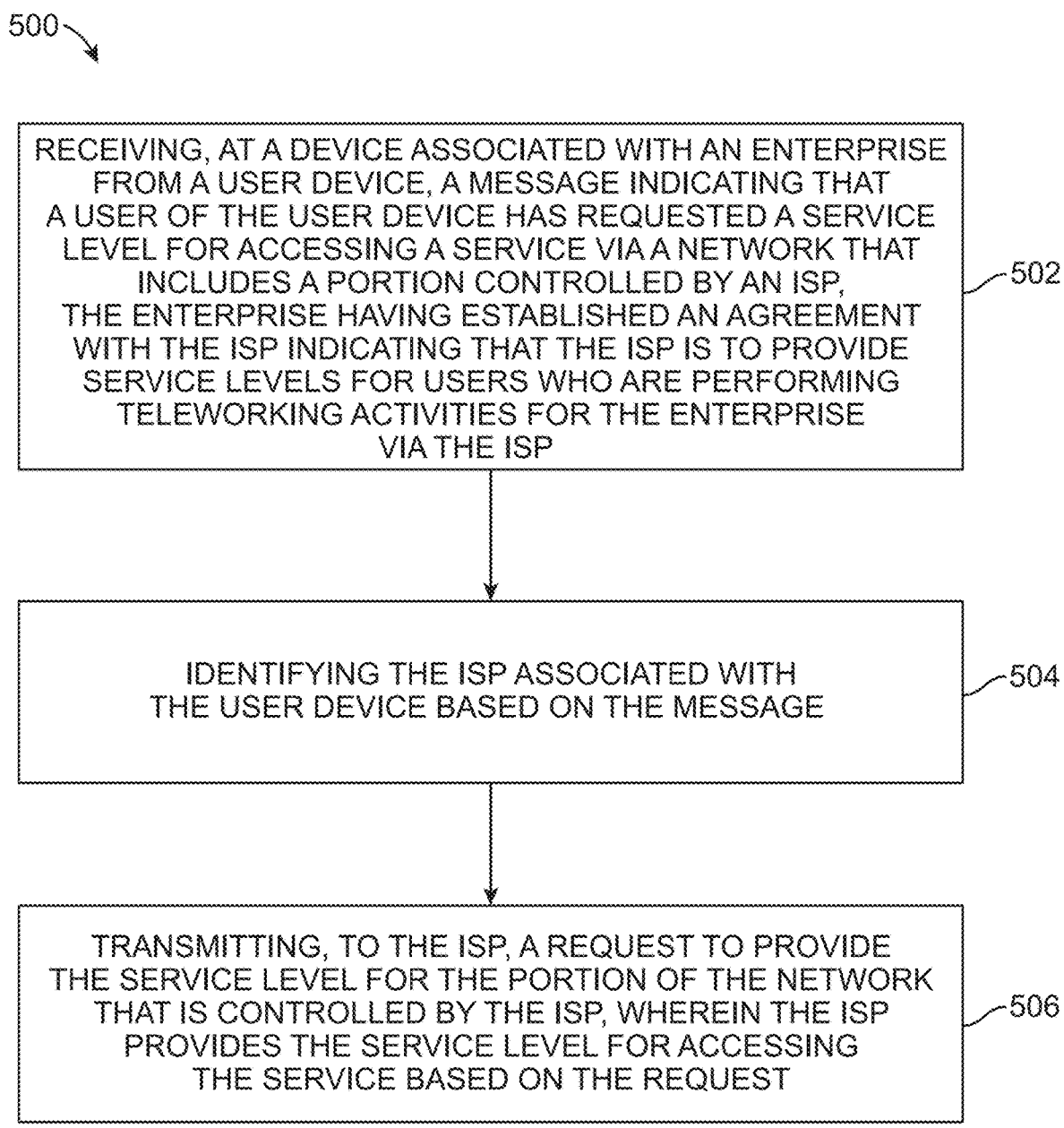
FIG. 5 is a flowchart of a method of providing a user triggered SLA-based access connectivity for a teleworker accessing a cloud/enterprise network via an ISP, in accordance with an example embodiment.

FIG. 5 is a flowchart of a method of providing a user triggered SLA-based access connectivity for a teleworker accessing a cloud or enterprise network via an ISP, in accordance with an example embodiment. In some embodiments, the method 500 discussed below with respect to FIG. 5 is performed by a network infrastructure device, such as user device 102, AP 104, teleworker controller 108, and/or ISP controller 110.

At 502, a message is received at a device associated with an enterprise and from a user device, the message indicating that a user of the user device has requested a service level for accessing a service via a network that includes a portion controlled by an ISP. The enterprise has established an agreement with the ISP indicating that the ISP is to provide service levels for users who are performing teleworking activities for the enterprise via the ISP. For example, teleworker controller 108 may receive a message from user device 102 requesting a service level for accessing a service via a network that includes a portion controlled by ISP 106.

At 504, the ISP associated with the user device may be identified based on the message. For example, ISP 106 may be identified based on information included in the message. In some embodiments, the ISP 106 may be identified based on an IP address of home router 103 that has been assigned by ISP 106. In other embodiments, the ISP 106 may be identified based on other information included in the message.

At 506, a request is transmitted to the ISP to provide the service level for the portion of the network that is controlled by the ISP. The ISP provides the service level for accessing the service based on the request. For example, teleworker controller 108 may transmit a request to ISP controller 110 to provide the service level for the portion of the network controlled by ISP 106. ISP controller 110 may enforce policies to provide the service level for accessing the request.

Figure 6:
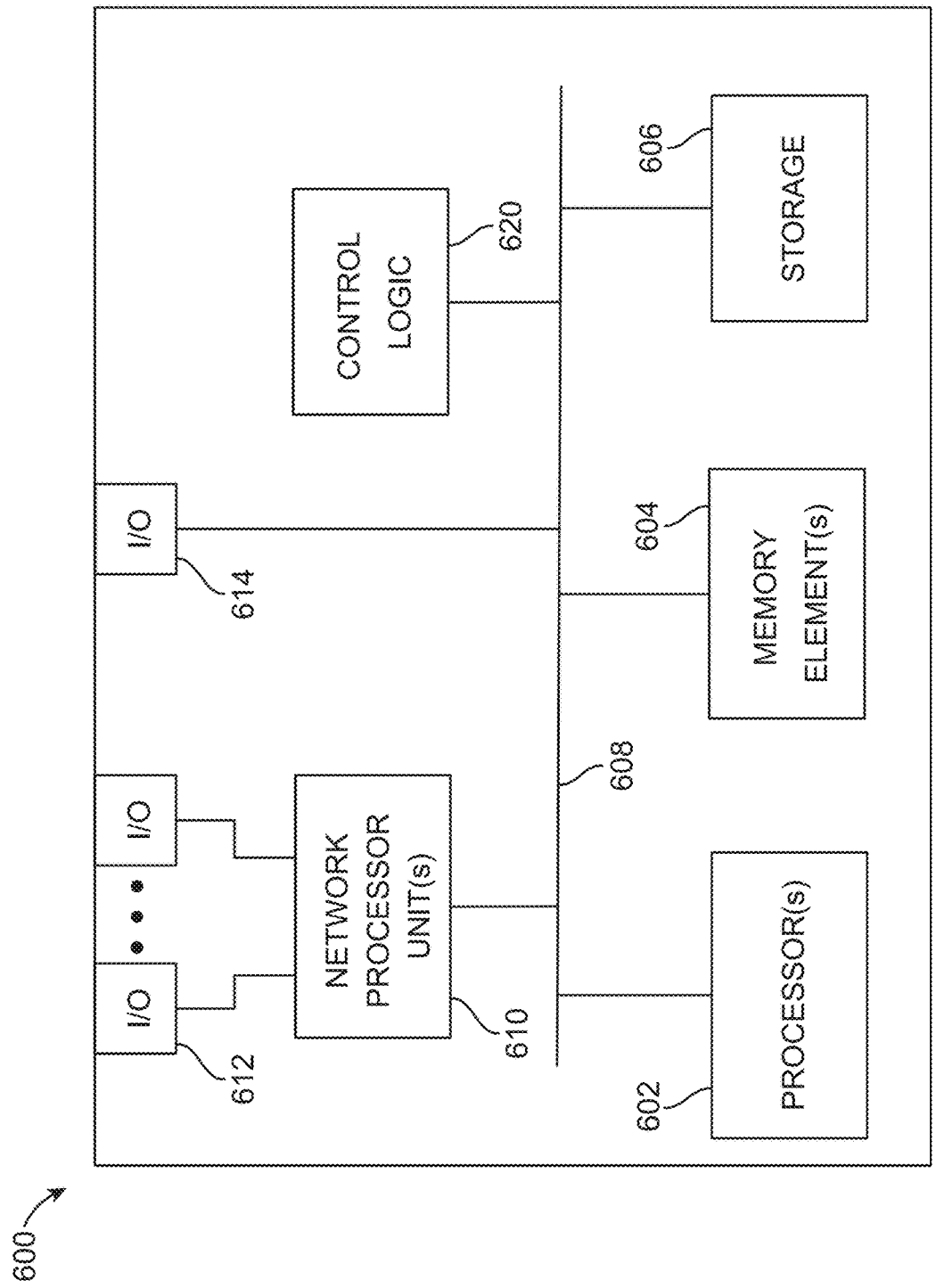
FIG. 6 is a hardware block diagram of a device that may perform functions associated with operations discussed herein in connection with the techniques depicted in any one or more of FIGS. 1-5.

FIG. 6 is a hardware block diagram of a device 600 that may perform functions associated with operations discussed herein in connection with the techniques depicted in any one or more of FIGS. 1-5. In various embodiments, any of the devices described above (e.g., a wireless end device, an AP, or a controller) implement, in some embodiments, a computing architecture analogous to that described below with respect to the device 600.

In at least one embodiment, the device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor)

can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. This may be the case, in particular, when the device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided comprising receiving, at a device associated with an enterprise from a user device, a message indicating that a user of the user device has requested a service level for accessing a service while performing teleworking activities for the enterprise, the user device accessing the service via a network that includes a portion controlled by an Internet Service Provider (ISP), the enterprise having established an agreement with the ISP indicating that the ISP is to provide service levels for users who are performing teleworking activities for the enterprise via the ISP; identifying the ISP associated with the user device based on the message; and transmitting, to the ISP, a request to provide the service level for the portion of the network that is controlled by the ISP, wherein the ISP provides the service level for accessing the service based on the request.

In one example, the message includes service information associated with the service and user information associated with the user. In another example, the method further comprises identifying a type of the service level based on the service information and the user information, wherein transmitting the request includes transmitting the type of the service level. In another example, the service information includes a type of the service and a duration of time that the service is to be accessed. In another example, the service includes a videoconferencing service.

In another example, the ISP establishes a cloud interconnect tunnel between the user device and the service in response to the request. In another example, the method further comprises receiving a second message from a second device associated with a second service, the second message requesting a second service level for an upcoming event associated with the second service, wherein the user is to participate in the upcoming event; and transmitting, to the ISP, a second request to provide the second service level for the user while the user is participating in the upcoming event. In another example, the method further comprises receiving an indication that the user device has transmitted a tunnel request to connect to an enterprise network controlled by the enterprise, the indication including a second service level determined based on information in the tunnel request; and transmitting, to the ISP, a second request to provide the second service level for the portion of the network that is controlled by the ISP.

In another form, an apparatus associated with an enterprise is provided comprising a network interface configured to enable network communications; one or more processors; and one or more memories storing instructions that when executed configure the one or more processors to perform operations comprising: receiving, from a user device, a message indicating that a user of the user device has requested a service level for accessing a service while performing teleworking activities for the enterprise, the user device accessing the service via a network that includes a portion controlled by an Internet Service Provider (ISP), the enterprise having established an agreement with the ISP indicating that the ISP is to provide service levels for users who are performing teleworking activities for the enterprise via the ISP; identifying the ISP associated with the user device based on the message; and transmitting, to the ISP, a request to provide the service level for the portion of the network that is controlled by the ISP, wherein the ISP provides the service level for accessing the service based on the request.

In another form, a non-transitory computer readable storage medium is provided comprising instructions that when executed configure one or more processors associated with an enterprise to perform operations comprising: receiving, from a user device, a message indicating that a user of the user device has requested a service level for accessing a service while performing teleworking activities for the enterprise, the user device accessing the service via a network that includes a portion controlled by an Internet Service Provider (ISP), the enterprise having established an agreement with the ISP indicating that the ISP is to provide service levels for users who are performing teleworking activities for the enterprise via the ISP; identifying the ISP associated with the user device based on the message; and transmitting, to the ISP, a request to provide the service level for the portion of the network that is controlled by the ISP, wherein the ISP provides the service level for accessing the service based on the request.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), an IEEE 802.11 (e.g., Wi-Fi®/Wi-Fib®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
receiving, at a device associated with an enterprise and from a user device, a message indicating that a user of the user device has requested a service level for accessing a service while performing teleworking activities for the enterprise, the user device accessing the service via a network that includes a portion controlled by an Internet Service Provider (ISP), the enterprise having established an agreement with the ISP indicating that the ISP is to provide service levels for users who are performing teleworking activities for the enterprise via the ISP;
identifying, by the device associated with the enterprise, the ISP associated with the user device based on the message; and
transmitting, by the device associated with the enterprise and to the ISP, a request to provide the service level for the portion of the network that is controlled by the ISP, wherein the ISP provides the service level for accessing the service based on the request.

2. The computer-implemented method of claim 1, wherein the message includes service information associated with the service and user information associated with the user.

3. The computer-implemented method of claim 2, further comprising:
identifying a type of the service level based on the service information and the user information, wherein transmitting the request includes transmitting the type of the service level.

4. The computer-implemented method of claim 2, wherein the service information includes a type of the service and a duration of time that the service is to be accessed.

5. The computer-implemented method of claim 1, wherein the service includes a videoconferencing service.

6. The computer-implemented method of claim 1, wherein the ISP establishes a cloud interconnect tunnel between the user device and the service in response to the request.

7. The computer-implemented method of claim 1, further comprising:
   receiving a second message from a second device associated with a second service, the second message requesting a second service level for an upcoming event associated with the second service, wherein the user is to participate in the upcoming event; and
   transmitting, to the ISP, a second request to provide the second service level for the user while the user is participating in the upcoming event.

8. The computer-implemented method of claim 1, further comprising:
   receiving an indication that the user device has transmitted a tunnel request to connect to an enterprise network controlled by the enterprise, the indication including a second service level determined based on information in the tunnel request; and
   transmitting, to the ISP, a second request to provide the second service level for the portion of the network that is controlled by the ISP.

9. An apparatus associated with an enterprise, comprising:
   a network interface configured to enable network communications;
   one or more processors; and
   one or more memories storing instructions that when executed configure the one or more processors to perform operations comprising:
      receiving, from a user device, a message indicating that a user of the user device has requested a service level for accessing a service while performing teleworking activities for the enterprise, the user device accessing the service via a network that includes a portion controlled by an Internet Service Provider (ISP), the enterprise having established an agreement with the ISP indicating that the ISP is to provide service levels for users who are performing teleworking activities for the enterprise via the ISP;
      identifying the ISP associated with the user device based on the message; and
      transmitting, to the ISP, a request to provide the service level for the portion of the network that is controlled by the ISP, wherein the ISP provides the service level for accessing the service based on the request.

10. The apparatus of claim 9, wherein the message includes service information associated with the service and user information associated with the user.

11. The apparatus of claim 10, wherein the one or more processors perform further operations comprising:
   identifying a type of the service level based on the service information and the user information, wherein transmitting the request includes transmitting the type of the service level.

12. The apparatus of claim 10, wherein the service information includes a type of the service and a duration of time that the service is to be accessed.

13. The apparatus of claim 9, wherein the service includes a videoconferencing service.

14. The apparatus of claim 9, wherein the ISP establishes a cloud interconnect tunnel between the user device and the service in response to the request.

15. The apparatus of claim 9, wherein the one or more processors perform further operations comprising:
   receiving a second message from a second device associated with a second service, the second message requesting a second service level for an upcoming event associated with the second service, wherein the user is to participate in the upcoming event; and
   transmitting, to the ISP, a second request to provide the second service level for the user while the user is participating in the upcoming event.

16. The apparatus of claim 9, wherein the one or more processors perform further operations comprising:
   receiving an indication that the user device has transmitted a tunnel request to connect to an enterprise network controlled by the enterprise, the indication including a second service level determined based on information in the tunnel request; and
   transmitting, to the ISP, a second request to provide the second service level for the portion of the network that is controlled by the ISP.

17. A non-transitory computer readable storage medium comprising instructions that when executed configure one or more processors associated with an enterprise to perform operations comprising:
   receiving, from a user device, a message indicating that a user of the user device has requested a service level for accessing a service while performing teleworking activities for the enterprise, the user device accessing the service via a network that includes a portion controlled by an Internet Service Provider (ISP), the enterprise having established an agreement with the ISP indicating that the ISP is to provide service levels for users who are performing teleworking activities for the enterprise via the ISP;
   identifying the ISP associated with the user device based on the message; and
   transmitting, to the ISP, a request to provide the service level for the portion of the network that is controlled by the ISP, wherein the ISP provides the service level for accessing the service based on the request.

18. The non-transitory computer readable storage medium of claim 17, wherein the message includes service information associated with the service and user information associated with the user.

19. The non-transitory computer readable storage medium of claim 18, the operations further comprising:
   identifying a type of the service level based on the service information and the user information, wherein transmitting the request includes transmitting the type of the service level.

20. The non-transitory computer readable storage medium of claim 18, wherein the service information includes a type of the service and a duration of time that the service is to be accessed.

* * * * *